G. J. COOPER.
INTERNAL COMBUSTION ENGINE.
APPLICATION FILED MAR. 15, 1918.

1,296,368.

Patented Mar. 4, 1919.
7 SHEETS—SHEET 4.

WITNESSES

INVENTOR
George J. Cooper
BY
ATTORNEYS

G. J. COOPER.
INTERNAL COMBUSTION ENGINE.
APPLICATION FILED MAR. 15, 1918.

1,296,368.

Patented Mar. 4, 1919.
7 SHEETS—SHEET 5.

WITNESSES

INVENTOR
George J. Cooper
BY
ATTORNEYS

UNITED STATES PATENT OFFICE.

GEORGE JAMES COOPER, OF HAVRE, MONTANA.

INTERNAL-COMBUSTION ENGINE.

1,296,368.  Specification of Letters Patent.  Patented Mar. 4, 1919.

Application filed March 15, 1918. Serial No. 222,707.

*To all whom it may concern:*

Be it known that I, GEORGE J. COOPER, a citizen of the United States, and a resident of Havre, in the county of Hill and State of Montana, have invented a new and Improved Internal-Combustion Engine, of which the following is a full, clear, and exact description.

Among the principal objects which the present invention has in view are: To maintain a relatively constant rotary pressure on a driving shaft and rotor associated therewith; to secure free explosions in the explosion chamber of the motor; to admit to the explosion chambers of the motor an explosive fuel and an expansive medium successively and independently in timed relation to the operation of the rotor; and to utilize the heat incident to the fuel explosions for generating the expansive medium.

Drawings.

Description.

Two sources of supply of motive power mediums are employed in the herein-disclosed engine. The power mediums referred to are an explosive fuel of a gaseous nature, and an expansive medium, such as steam. These two mediums are employed successively or in rotation. That is to say, the explosive fuel is employed independently of the steam and the steam independently of the explosive fuel. Both mediums, however, are utilized in the same projectors and operate in substantially the same manner upon the rotor.

Figures 4, 5, 10, 11:
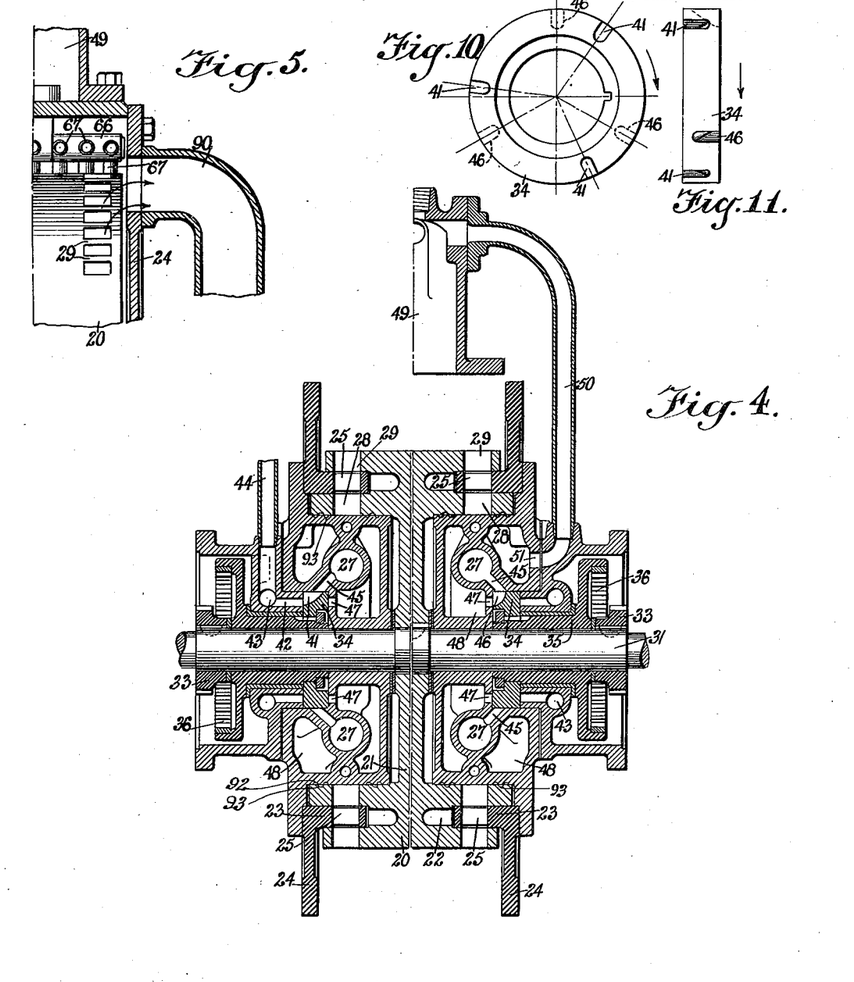
Fig. 4 is a longitudinal section on a diminished scale, the section being taken as on the line 4—4 in Fig. 3.
Fig. 5 is a detail in section, the section being taken as on the line 5—5 in Fig. 4.
Fig. 10 is a detail view showing the face of the disk valve.
Fig. 11 is an edge view of the same.

It will be understood that two sets of projectors with their associated operating elements are employed and operate upon the same rotor, which, as seen best in Fig. 4 of the drawings, forms a separating or divisional element in the structure.

It will also be noted that the projectors and casing therefor are non-rotary, while the rotor is rotary and is rigidly connected with the driving shaft of the engine to revolve the same.

As each set of projectors and parts associated therewith and the two sides of the rotor are substantially identical, the following description will be limited to one set of projectors and to one side of the rotor; it being thought essential for a clear understanding of the invention to indicate only where necessary the related actions of the opposite set of projectors.

As seen best in Fig. 4 of the drawings, the rotor 20 has a central web 21 and oppositely-extended rim which is annularly divided by a groove 22 to form recesses for receiving annular flanges 23 internally extended from the side plates or casings 24. The side plates 24 are stationary and the flanges 23 thereof have openings therethrough forming curved vanes 25 and open intermediate spaces 26. The vanes 25 form passages for the escape of the explosive or the expansive medium expelled from the projectors 27, when the passages between the vanes 28 and 29 in the rotor register with the passages between the vanes 25.

Figure 2:
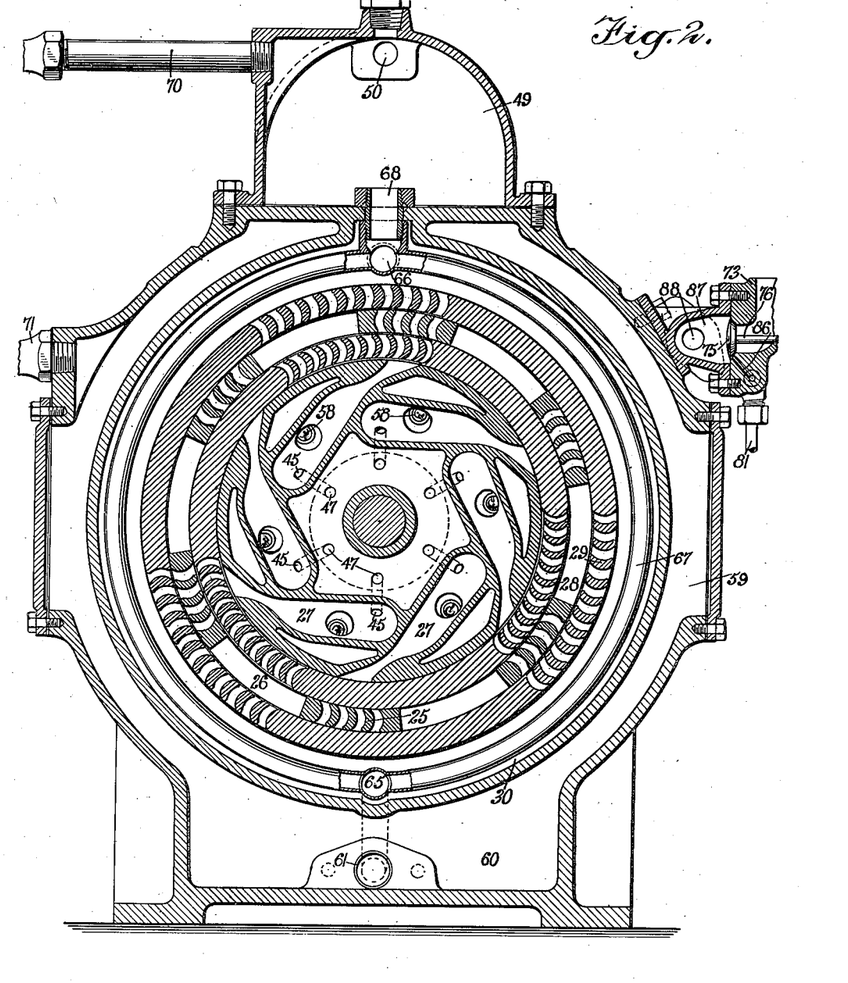
Fig. 2 is a vertical cross section, the section being taken as on the line 2—2 in Fig. 1.

As seen best in Fig. 2 of the drawings, the vanes 25, 28 and 29 are relatively reversely curved. The vanes 28 receive the first impact of the medium expelled from the projectors 27, and operate to deflect the current of the said medium. The current of the medium is again deflected by the vanes 25 and delivered to the vanes 29 where the current is again deflected before delivery to the exhaust chamber 30.

The rotor 20 is keyed fast to a driving shaft 31 on which is mounted a fly wheel or driving pulley 32. To the shaft 31 is also keyed a gear wheel 33 for operating a valve disk 34. The disk 34 is keyed to a sleeve 35 extended from the internal gear wheel 36. The gear wheel 36 and the gear wheel 33 are operatively connected to pinions 37 and 38, which pinions are mounted on a stud shaft 39 in the housing 40. The valve disk 34 has two series of ports, the ports of said series opening from opposite sides of said disk.

As shown best in Fig. 4 of the drawings, the ports 41 register with passages 42 extending from an annular fuel-supply chamber 43. The chamber 43 is connected with a fuel supply by means of a pipe 44.

As stated at the beginning of the specification, the fuel supply is deposited in any convenient location. The fuel or some element thereof is maintained under pressure so that when the ports 41 register with the passages 42, the fuel supply is forced into the projectors 27 by way of the passages 45. The maximum explosion pressure of the fuel within the projectors 27 is thus secured.

As seen at the right of the center in Fig. 4 of the drawings, the ports 46, which form the second series, register with the passages 47 which enter the chamber 48. The chamber 48 is normally charged with live steam delivered thereto from a steam dome 49 by way of the pipe 50 and passage 51.

Figure 1:
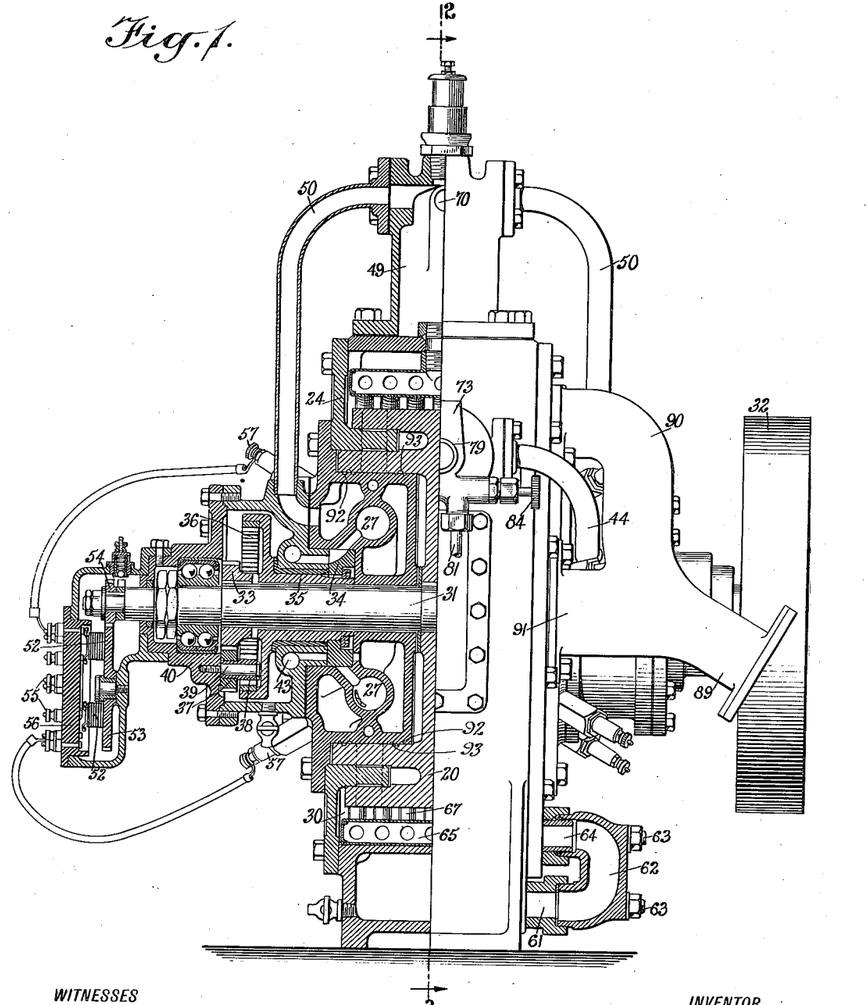
Figure 1 is a side elevation, partly in section, of an engine constructed and arranged in accordance with the present invention, the section being taken on the center line to show one-half of the engine.

The ports 41 and 46 are disposed in paired relation, each pair being arranged on opposite sides of each disk, the members of each pair being 30° separated, the ports 41 being relatively in the lead, so that the charge of explosive fuel delivered thereby to the projectors 27 precedes the delivery of steam to the said projectors. The explosive fuel charges are ignited by an electrical sparking system in which is incorporated a rotary distributer having contacts 52 mounted on a gear wheel 53, the teeth whereof are meshed with a pinion 54 at the terminal of the shaft 31. There are three contacts triangularly disposed, which complete the circuit through sets of three terminals having exposed binding posts 55 mounted on the face plate 56, as seen best in Fig. 1 of the drawings. The binding posts 55 are each connected with one of the spark plugs 57, the terminals 58 whereof extend into the projectors 27, as seen best in Fig. 2 of the drawings.

The ignition system is so arranged that explosive fuel charges in three projectors are fired simultaneously and just preceding the exposure of the discharge openings of the said projectors to the vanes 28 of the rotor 20. The pre-ignition thus established allows time for full expansion of the gases before escaping from the projectors through the passages between the said vanes 28.

The paths of the current of escaping gases have been above outlined, the result of which is to doubly impel the rotor 20 for producing the necessary torque thereof.

By the arrangement of the ports 41 and 46, the interval between the opening of each port 41 and subsequent explosion of the charge delivered thereto, permits the travel of the vanes 28 and 29 of the rotor fully past the delivery end of said projector, prior to the registration of the following port 46 which admits steam to said projector for delivering to the vanes 28 and 29 of the relatively succeeding set of vanes. In other words, each projector functions in *seriatim* to (1) deliver through the vanes 28, 29 of the rotor, expanding gases; (2) deliver live steam through the next relatively succeeding vanes 28, 29; and (3) draw by suction the combusted gases and steam into the exhaust chamber 30. The above-described series of functions occurs simultaneously in the order named in each set of three of the projectors 27. The projectors 27 used may vary in number, that shown in the drawings as the preferred embodiment of the invention employing six. The six projectors are arranged as two series of three each and are disposed in alternate or interleaved arrangement. Each projector has its spark plug 57. The spark plugs 57 are operated in sets of three, each set functioning once to each revolution of the shaft 31.

As there are six projectors and six fixed sets of vanes 25 and three sets of the vanes 28 and 29, the arrangement provides for the passage of the three sets of vanes 28 and 29 in front of each projector during each revolution of the shaft 31 and rotor 20 connected therewith. To seal the joint between the under side of the rotor and of the casting through which opens the delivery ends of the projectors 27, the casting is provided with a series of annular grooves 92 and the abutting face of the rotor with grooves 93. These grooves become charged with oil which operate to efficiently and completely check the flow of gas or steam between the said rotor and the said casting. It is obvious that when both the explosive fuel and the live steam are introduced into the projectors 27, the delivery ends thereof are closed by the inner surface of the inner flange of the rotor 20.

The timing of the valve disks is such that a second series of impulses is given to each set of vanes 28 and 29 in positions angularly separated from the positions where they received the first set of impulses, or, in other words, the vanes 28 and 29 receive two separate series of impulses at each revolution of the rotor.

The sets of projectors 27 at the opposite sides of the web 21 of the rotor 20, are disposed to function in alternate manner, that is to say, the valve disks 34 are arranged to open the projectors 27 on one side for receiving steam, while the opposite disk valve opens the projectors on the other side for charging with explosive fuel. In this manner it will be seen that the impulses imparted by the projectors on the opposite sides equalize the torque tension by uniting alternately the weaker impulses with the stronger impulses on the two opposite sides of the rotor.

The steam employed as a motive factor is generated from water placed in an enveloping chamber 59. The chamber 59 has a rectangular well 60 at the bottom thereof from which extends a pipe fitting 61. The fitting 61 forms an open passage to the well 60 and is used to receive a by-pass loop 62, which is held in position by bolts 63 engaged with the end of a slip sleeve 64, through which a pipe extension or header 65 projects. The sleeve 64 is slightly tapered to form a joint for compression when the loop 62 is forced into service position. The header 65 corresponds with the header 66. The headers 65 and 66 are suitably connected by semicircular thin boiler tubes 67. The tubes 67 are made as thin as convenient to offer as little resistance as possible for the heat of the exhaust from the gas explosions of the projectors 27, which exhaust enters the chamber 30 in which the coils or tubes 67 are disposed.

It will be observed that the combusted and flaming gases after passing from the projectors 27 and between the vanes 28, 25 and 29 envelop and pass between the tubes 67. Intense heat thus delivered to the tubes 67 operates to convert the water contained therein to steam, which passes from the header 66 through a fitting 68 to the steam dome 49. As described, the steam from the steam dome is delivered by way of the pipe 50 to the chamber 48 from whence it enters the projectors 27 whenever the ports 46 register with the passages 47.

Figure 3:
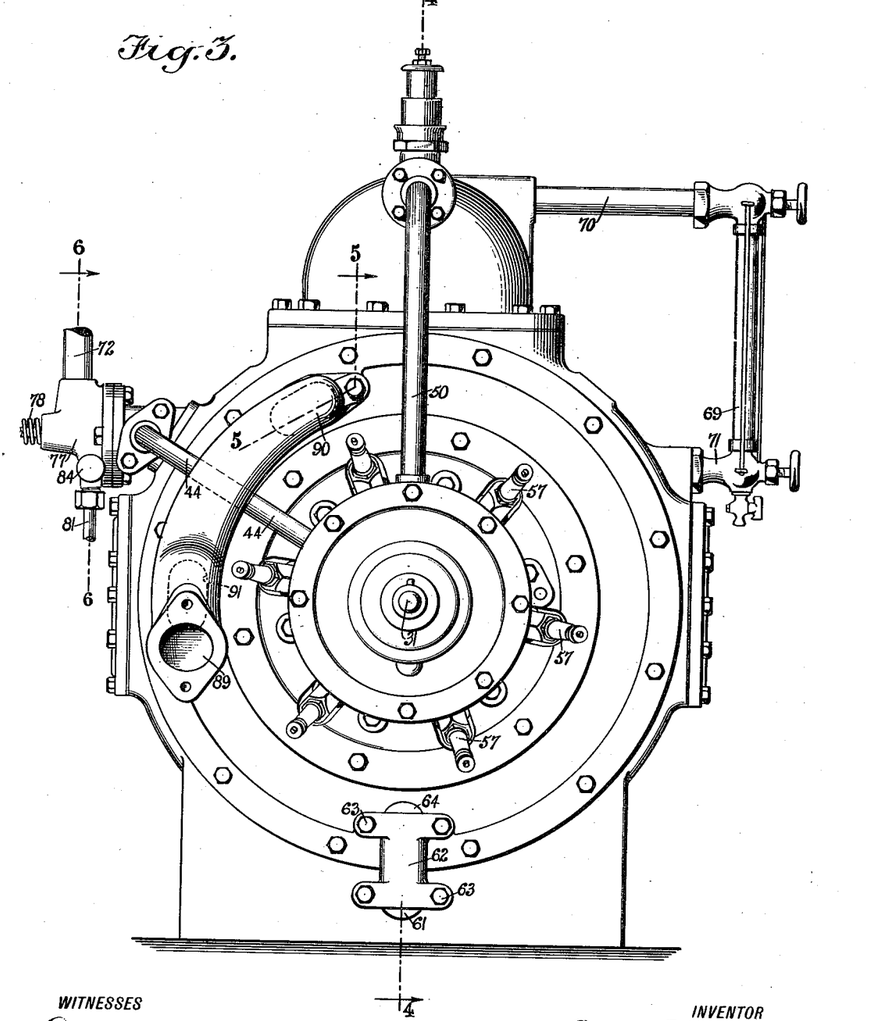
Fig. 3 is an end view of the engine, the fly-wheel being removed from the driving shaft thereof.

The height of the water in the chamber 59 and water tubes 67 is disclosed by the sight gage 69, shown best in Fig. 3 of the drawings. The gage 69 is connected with the dome 49 by a pipe 70, and with the chamber 59 by a fitting 71.

Figure 6:
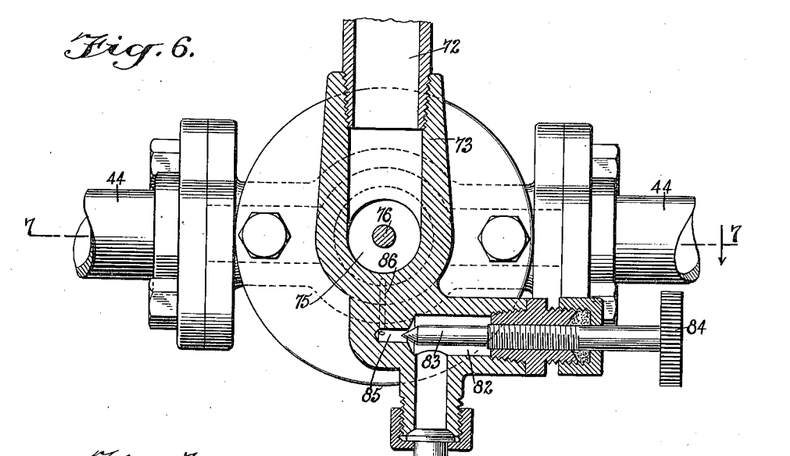
Fig. 6 is a detail view on an enlarged scale, showing in section the inlet valve, the section being taken as on the line 6—6 in Figs. 3 and 7.
Figure 7:
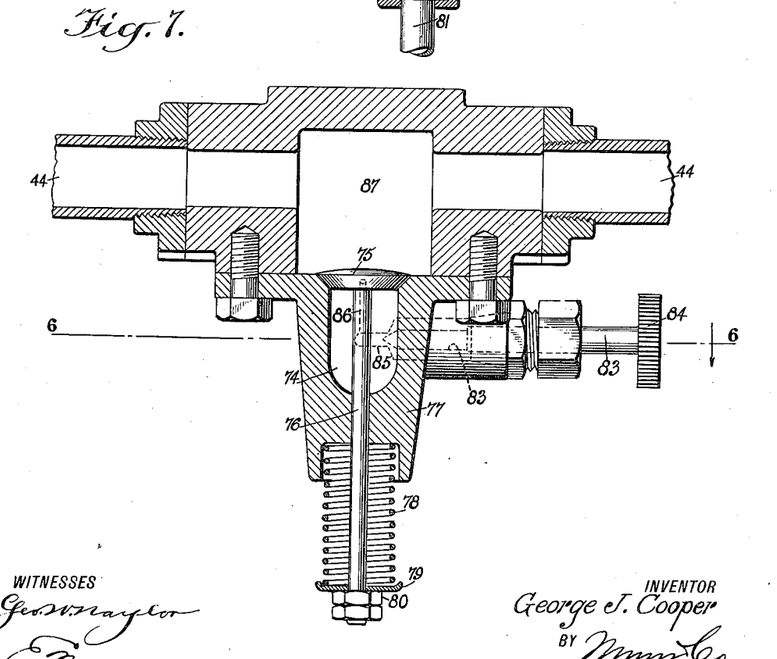
Fig. 7 is a cross section taken as on the line 7—7 in Fig. 6.
Figure 8:
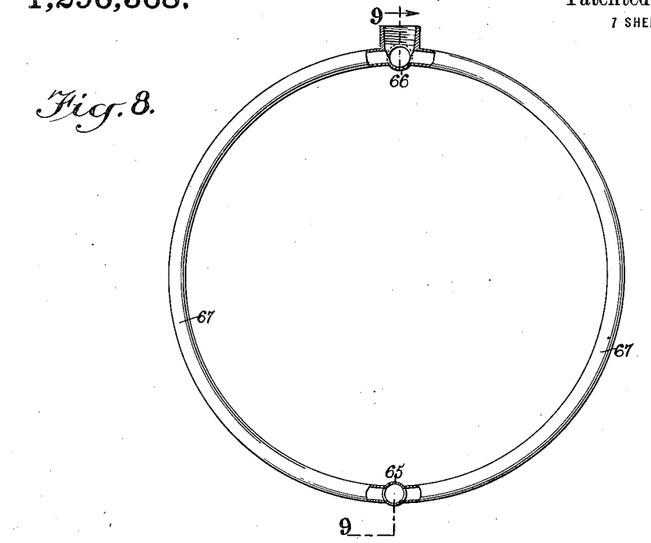
Fig. 8 is a cross section of a coil for heating the steam employed as a motive force in the herein-disclosed engine, the section being taken as on the line 8—8 in Fig. 9.
Figure 9:
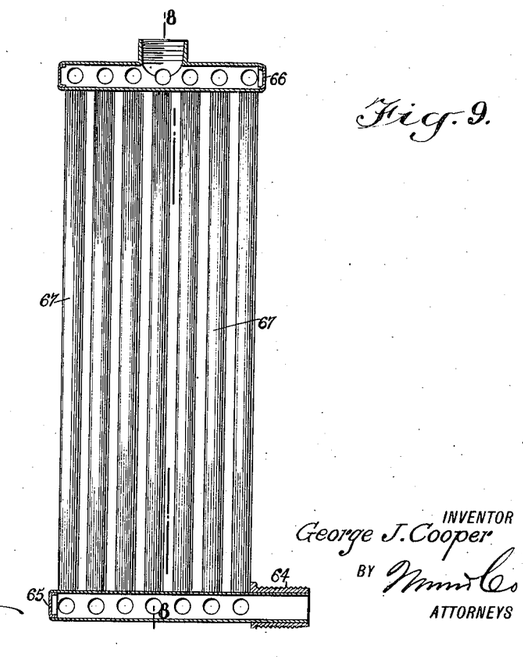
Fig. 9 is a longitudinal section of said coil, the section being taken as on the line 9—9 in Fig. 8.
Figures 12, 13:
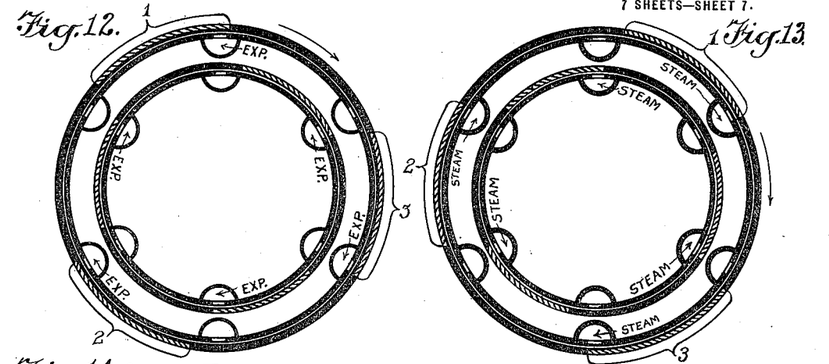
Figs. 12 to 17, inclusive, are diagrammatic views illustrating the operation of the projectors at opposite sides of the engine and of the rotor influenced thereby.
Figures 14, 15:
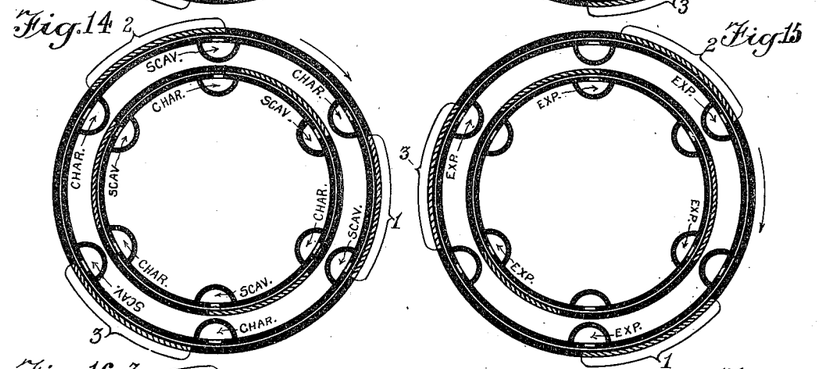
Figures 16, 17:
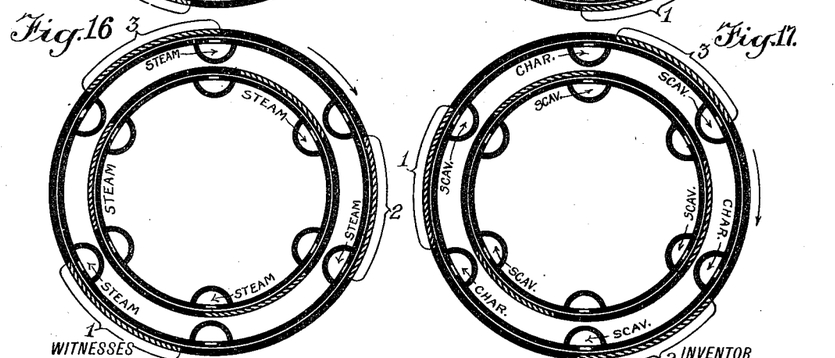

The fuel used in the projectors 27 is supplied by a carbureter best shown in Figs. 2, 6 and 7. The carbureter is supplied with compressed air by means of a pipe 72. The means for compressing the air is not shown in the drawings. The pipe 72 engages a threaded nipple 73 at the lower end of which is a laterally-opening chamber 74 normally closed by a valve 75. The valve 75 has a stem 76 guided in bearings provided in the boss 77. The valve 75 is seated by a spring 78, one end whereof is depressed in a socket formed in the extremity of the boss 77, and the other end whereof is capped by a washer 79, against which an adjusting nut 80 rests. It is obvious that as the nut 80 is advanced or receded, the tension of the spring 78 is varied.

Suitable vaporizing liquid, such as gasolene, is delivered to the carbureter from a suitable supply, by means of a pipe 81. The pipe 81 delivers the liquid to a chamber 82, the outlet from which is regulated by a needle valve 83. The needle valve is manipulated having a knurled head 84 to facilitate the action. The tapered end of the valve 83 controls the opening to the channel 85. Leading from the channel 85, is a delivery channel 86, the delivery end whereof, as shown best in Figs. 2 and 7, is closed by the valve 75 when the same is seated. The mixed vapor and air is delivered preliminarily to a mixing chamber 87, from which the mixture is conveyed by pipes 88. The pipes 88 deliver the fuel to the chambers 43 at opposite sides of the engine.

From the foregoing, it is obvious that when the valve disks 34 are rotated to the positions where the ports 41 register with the passages 42 and 45, the air pressure in the chamber 74 opens the valve 75 and delivers air to the chamber 87 and pipes 44. In doing this, the air rushing past the delivery opening of the channel 86, draws the gasolene or fuel liquid therefrom, mixing the same with the air in the chamber 87 prior to delivery to the projectors 27 through the pipes 44 and chambers 43.

For preventing the building up of pressure in the exhaust chamber 30, with the consequent retardation of currents of gas and steam passing through the rotor, I provide an exhaust manifold 89, which, for the sake of increased efficiency, is divided to form two arms 90 and 91, which open into the chamber 30 at different points, thereby distributing the exhaust currents passing to the manifold 89.

Attached to the manifold 89 is preferably an air-exhausting system of any approved type, said system not being shown in the present drawings. When using a device of this character, the pressure in the chamber 30 is maintained below atmospheric pressure. When, in the operation of the engine, the vanes 28 and 29 of the rotor register with the vanes 25 of the flanges 23, in line with any projector 27 which at the moment the valve disk 34 has closed, the lower pressure in the chamber 30 causes the products of explosion to be drawn from said projector.

In the operation of the engine, the timing of the valves 34 and of the ignition system is such as to promote the performance of three functions in each of the projectors 27 for each revolution of the rotor. Starting with the explosion of fuel; the second function is to permit columns of steam to enter the projectors; and the third function is to exhaust the inert gases and steam therefrom to the chamber 30 and the interposed vanes 28, 25 and 29, while the valve disk holds closed the port entrance of the projector. This action is facilitated by the lower pressure maintained in the chamber 30.

During the intermission between the passage of the third set of vanes just referred to and the interposition of the first set of vanes 28 and 29, the disk valve 34 is rotated to register the port openings 41 with the passages 42, which permits the compressed air in the pipe 72 to open the valve 75 and to force the enriched explosive mixture through the chambers 43 to the projectors while the delivery end thereof is closed by the wall of the rotor 20.

*Claims.*

1. An engine as characterized comprising a rotor having a plurality of impulse faces; a plurality of power generators for emitting expanding gases and expanding vapors alternately against said faces; an exhaust chamber for said gases; and a vapor-generating apparatus, a portion of said apparatus being disposed within said chamber for heating said vapor by the exhaust gases from said generators.

2. An engine as characterized comprising a rotor having laterally-extended concentric flanges, said flanges being spaced apart for forming an edge-opening channel, said flanges having a plurality of series of radially coincident vanes; stationary vanes disposed between said flanges for alinement with the vanes of said flanges; a casing supporting said stationary vanes and having an expansion chamber exterior to said flanges; a plurality of stationary chambers for expansive medium, said chambers being arranged for delivering said medium for passage through said vanes; means for closing the outlets of said chambers intermediate the periods when the same are in communication with the passages formed by said vanes; and means for supplying said medium to said chambers in timed relation to the movement of said rotor.

3. An engine as characterized comprising a rotor having laterally-extended concentric flanges, said flanges being spaced apart for forming an edge-opening channel, said flanges having a plurality of series of radially coincident vanes; stationary vanes disposed between said flanges for alinement with the vanes of said flanges; a casing supporting said stationary vanes and having an expansion chamber exterior to said flanges; a plurality of stationary chambers for expansive medium, said chambers being arranged for delivering said medium for passage through said vanes; means for closing the outlets of said chambers intermediate the periods when the same are in communication with the passages formed by said vanes, said means embodying solid sections of said flanges, said sections being intermediate said series of vanes; and means for supplying said medium to said chambers in timed relation to the movement of said rotor, said means embodying two sources of supply of different mediums, and alternately-acting valves for admitting said mediums to said chambers successively.

4. An engine as characterized comprising a rotor having laterally extended concentric flanges, said flanges being spaced apart for forming an edge-opening channel, said flanges having a plurality of series of radially coincident vanes; stationary vanes disposed between said flanges for alinement with the vanes of said flanges; a casing supporting said stationary vanes and having an expansion chamber exterior to said flanges; a plurality of stationary chambers for expansive medium, said chambers being arranged for delivering said medium for passage through said vanes; means for closing the outlets of said chambers intermediate the periods when the same are in communication with the passages formed by said vanes, said means embodying solid sections of said flanges, said sections being intermediate said series of vanes; two sources of supply mediums of different character; and means for supplying said medium to said chambers in timed relation to the movement of said rotor, said means embodying a rotary valve disk normally closing said chambers and arranged to deliver said mediums to said chambers successively.

5. An engine as characterized comprising a rotor having laterally-extended concentric flanges, said flanges being spaced apart for forming an edge-opening channel, said flanges having a plurality of series of radially coincident vanes; stationary vanes disposed between said flanges for alinement with the vanes of said flanges; a casing supporting said stationary vanes and having an expansion chamber exterior to said flanges; a plurality of stationary chambers for expansive medium, said chambers being arranged for delivering said medium for passage through said vanes; means for closing the outlets of said chambers intermediate the periods when the same are in communication with the passages formed by said vanes, said means embodying solid sections of said flanges, said sections being intermediate said series of vanes; two sources of supply of different character; and means for supplying said medium to said chambers in timed relation to the movement of said rotor, said means embodying a plurality of valve disks, said disks normally closing said chambers and each arranged to deliver said mediums to said chambers successively, said disks being arranged to deliver mediums of different characters simultaneously to said chambers.

GEORGE JAMES COOPER.